Figure 1:
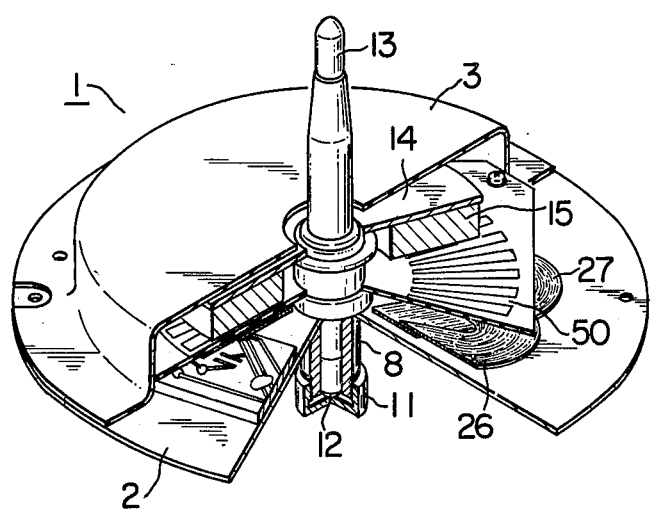

United States Patent [19]

Fujita et al.

[11] 4,109,170
[45] Aug. 22, 1978

[54] ELECTRIC MOTOR HAVING FREQUENCY GENERATOR

[75] Inventors: Masahiko Fujita; Toshihiko Gotoh, both of Yokohama; Hiroshi Hagino, Omiya, all of Japan

[73] Assignees: Hitachi, Ltd.; Japan Servo Co., Ltd., both of Japan

[21] Appl. No.: 733,779

[22] Filed: Oct. 19, 1976

[30] Foreign Application Priority Data

Oct. 22, 1975 [JP] Japan .................................. 50-126441

[51] Int. Cl.² ............................................. H02K 11/00
[52] U.S. Cl. .................................. 310/68 R; 310/112; 310/268; 318/254
[58] Field of Search ............... 310/68 R, 68 A, 268, 310/156, 46, 112; 318/138, 254

[56] References Cited

U.S. PATENT DOCUMENTS

| | | | |
|---|---|---|---|
| 3,109,114 | 10/1963 | Henry-Baudot | 310/268 |
| 3,219,861 | 11/1965 | Burr | 310/268 |
| 3,230,406 | 1/1966 | Henry-Baudot | 310/268 X |
| 3,402,333 | 9/1968 | Hayner | 318/138 |
| 3,569,753 | 3/1971 | Babikyan | 310/68 |
| 3,796,899 | 3/1974 | Giachello | 310/156 |
| 3,906,267 | 9/1975 | Coupin et al. | 310/68 |

*Primary Examiner*—Donovan F. Duggan
*Attorney, Agent, or Firm*—Craig & Antonelli

[57] ABSTRACT

An electric motor having a rotor consisting of a disk-shaped multi-polar magnet circumferentially sectioned to have a plurality of magnetic poles, a stator consisting of a pair of superimposed star-shaped flat driving coils, said driving coils being disposed facing said magnet, said driving coils being arranged to be supplied with respective alternating currents having a phase differential of 90° thereby to drive the disk-shaped magnet, said motor further comprising a speed detecting coil having a plurality of radially disposed generating wire elements, said generating wire elements being disposed within a magnetic field of said magnet and being connected in series, whereby a signal having a frequency corresponding to the revolution speed of said disk-shaped magnet is induced in said speed detecting coil.

13 Claims, 5 Drawing Figures

U.S. Patent  Aug. 22, 1978  Sheet 2 of 3  4,109,170

ELECTRIC MOTOR HAVING FREQUENCY GENERATOR

The present invention relates to electric motors having a frequency generator capable of producing a signal having a frequency proportional to the speed of revolution and, more particularly, to electric motors used for disk record players, magnetic tape recorders or magnet tape players, which motor can produce a signal representative of the speed of revolution, which signal in turn is utilized in the speed control of the motor.

In disk record players or in magnetic tape recorders and players, the disk or the tape is strictly required to be correctly moved at a predetermined speed. Any change in the moving speed would cause a frequency modulation of the reproducing signal, which undesirably results in a flutter or a wow.

To avoid this drawback, in the recording or reproducing apparatus having a turn table or a capstan directly driven by a motor, the speed of revolution of the motor must be maintained constant.

It is a conventional measure to convert the revolution speed of the motor or the change in the revolution speed into a signal having variation in frequency, voltage or capacitance, which signal is compared with a reference signal representative of a correct revolution speed, thereby to correct the revolution speed proportional to the difference produced in comparison with the reference signal.

Hitherto, several approaches have been proposed and used for detecting the revolution speed of a motor.

One of them employ a magnet carried by the rotor for revolution therewith and a generator coil disposed to oppose the magnet so that the magnetic flux may intersect the coil thereby to produce a signal of a frequency proportional to the revolution speed. This arrangement has been found, however, inconvenient in that the size of the structure becomes unacceptably large, due to the additional provision of the magnet on the rotor, especially when the number of poles of the magnet or the number of the coil is increased for obtaining a signal of a high frequency. Such a large motor is impractical for use in disk record players or magnetic tape recorders or the like in which a number of parts are housed by a cabinet of a limited size.

Another means for detecting the revolution speed of a motor employ an optical means including a disk carried by the rotor. The disk is provided with a number of peripheral equispaced slits. A light source such as a lamp is disposed at one side of the disk, while a light-sensitive equipment such as a photo transistor is disposed at the other side, so that the light passing through the slits may generate a signal of a frequency which is in proportion to the revolution speed, at the light-sensitive equipment. This arrangement has been found also unsatisfactory, due to the complicated structure of the motor, especially when the number of slits and/or the light source is increased to obtain a signal of a higher frequency.

Clearly, the higher frequency of the revolution speed signal provides the more accurate speed control of the motor when the speed control is effected using the revolution speed signal. In addition, it is preferred that the motor does not produce electric and mechanical noises which would badly affect the electronic instrument which is highly sensitive even to a weak signal.

It is therefore an object of the invention to provide an electric motor which is flattened in shape and reduced in size and has a frequency generator capable of detecting the change in the revolution speed as a change in frequency.

It is another object of the invention to provide an electric motor having a frequency generator capable of generating a revolution speed signal of high frequencies.

It is still another object of the invention to provide an electric motor having a frequency generator, which does not produce electric and mechanical noises and the speed of which can be controlled easily.

According to the invention, there is provided an electric motor having a frequency generator, said motor comprising a rotor consisting of a disk-like multipolar magnet connected to a rotary shaft, said magnet being magnetized into a plurality of divided magnetic poles, a stator having a driving coil opposing to said magnet and including a plurality of driving portions interlinking the magnetic fluxes of said magnet, a speed detecting coil disposed in the field of said magnet and having generating wire elements which is $2n + 1$ ($n$ being a positive integer) in number for each magnetic pole, said coil being disposed radially around said rotary shaft, whereby said magnetic fluxes are interlinked by said generating wire elements so as to produce in the latter a signal of a frequency corresponding to the rotational speed of said magnet.

The electric motor is advantageously flattened and small-sized, due to the adoption of the disk-shaped multipolar magnet. At the same time, the provision of a number of generating wire elements for each magnetic pole of the magnet provides a signal of high frequencies, which conveniently ensures the detection of even a small change in the revolution speed.

Figure 2:
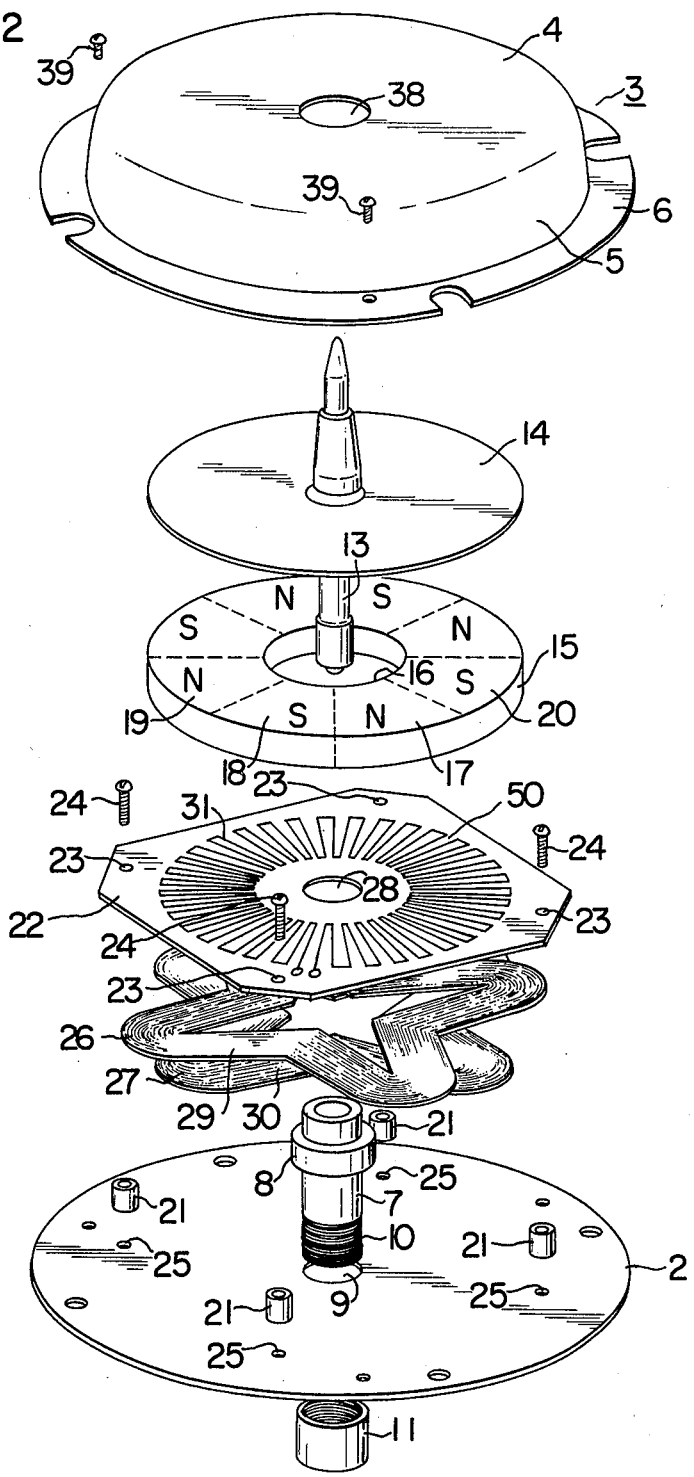
Figure 3:
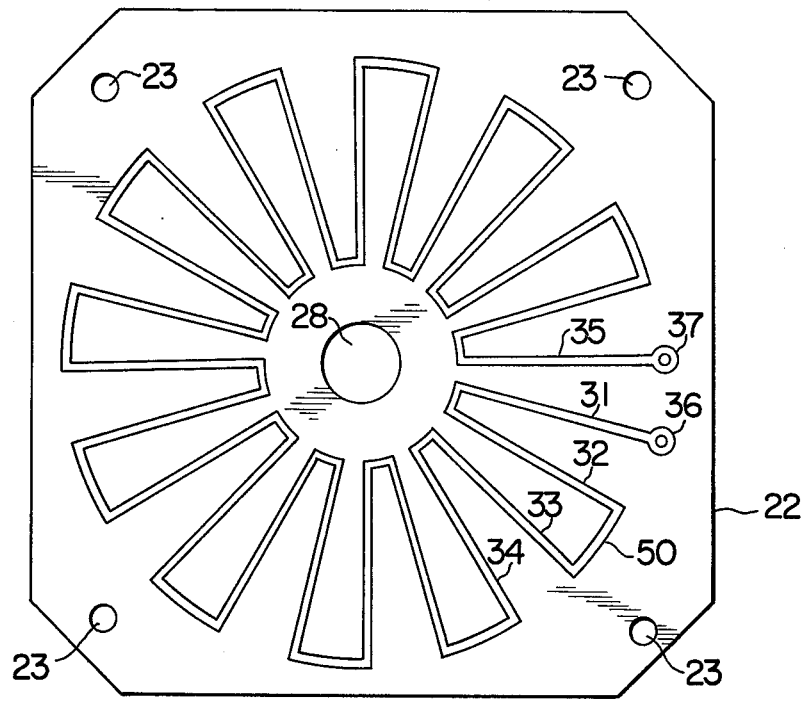
Figure 4A:
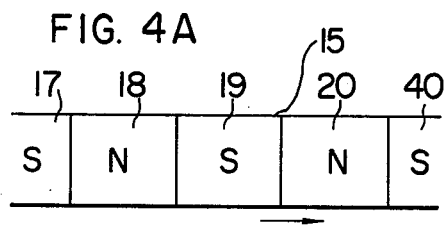
Figure 4A:
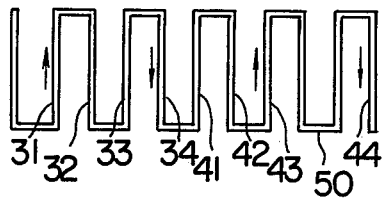
Figure 4B:
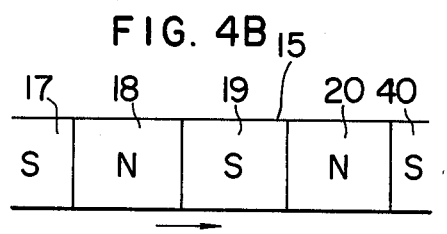
Figure 4B:
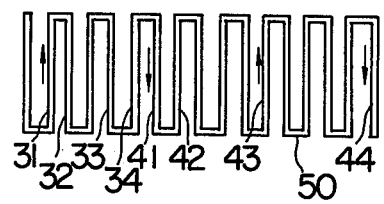

The above and other objects, features and advantageous effects of the invention will become more clear from the following detailed description of preferred embodiments of the invention, when taken in conjunction with the accompanying drawings, in which:

FIG. 1 is a partially sectioned perspective view of an electric motor having a frequency generator in accordance with the present invention, FIG. 2 is an exploded view of the motor of FIG. 1, FIG. 3 is a perspective view of a speed detecting coil, FIG. 4A is an exploded view of a disk magnet and a speed detecting coil, and FIG. 4B is an exploded view of the disk magnet and the speed detecting coil in which the number of generating wire elements has been increased relative to that in FIG. 4A.

Referring at first to FIGS. 1 and 2, an electric motor 1 has a disk-shaped base plate 2 of a magnetic material such as ferro or silicon plate and a cup-shaped upper cover 3 mounted on the base plate. The upper cover 3 consists of an upper plate 4, a cylindrical portion 5 connected to the upper plate and an annular rim 6 which are all made of a magnetic material. The base plate 2 is adapted to play the role of a lower yoke and has at its mid portion a cylindrical bearing 7. The bearing 7 is made of a non-magnetic material such as brass and is provided with an upper peripheral rim 8, and is inserted into a central opening 9 of the base plate 2 until the lower surface of the rim 8 comes in contact with the upper surface of the base plate 2. The bearing 7 has a threaded lower end 10 onto which screwed is a cap 11 accommodating a ball bearing 12 adapted to carry a rotary shaft 13 inserted into the bearing 7 from its upper side. Thus, the rotary shaft 13 is rotatably supported by the bearing 7 and by the ball bearing 12.

The rotary shaft 13 carries at its mid portion an upper yoke 14 made of a magnetic material such as ferro or silicon steel, to the lower surface of which secured by means of an adhesive is a disk-shaped multipolar magnet 15. The magnet 15 is made of a magnetic material such as aluminum, nickel, alloy of cobalt or ferrite and has a central opening 16 through which passed is the rotary shaft 13. Thus, the magnet 15 is secured to the upper yoke 14 concentrically with the rotary shaft 13. The magnet 15 is circumferentially sectioned to have a plurality of sections, eight sections in the illustrated embodiment. The adjacent sections are differently magnetized. For example, a section 17 is magnetized to become N pole at the upper surface of the magnet 15, while the sections 18, 20 adjacent to the section 17 are magnetized to become S poles. The section 19 next to the section 18 is accordingly magnetized to N. Each section 17, 18, 19 . . . is magnetized in its thickness-wise direction so as to exhibit different polarities at the upper and lower surfaces thereof. For instance, supposing that the upper surface of the section 17 is magnetized to N, the lower surface is magnetized to S.

Four washers 21 are disposed on the upper surface of the base plate 2. The washers 21 carry an insulation plate 22 made of a phenol resin or a like material having a central opening 28 receiving the bearing 7. The insulation plate 22 is secured to the base plate 2, defining therebetween a certain gap provided by the washers 21, by means of screws 24 screwed into threaded bores 25 of the base plate 2 through bores 23 formed at the corners of the insulating plate 22 and through respective washers 21.

A pair of driving coils 26, 27 are secured to the lower surface of the insulating plate 22, each of which consists of a number of fine copper wires having outer insulative layers, which wires being wound in the shape of a star. More strictly, the star-shaped winding is made by bending the wire at successive inner and outer points for a number of repeated turns, four outer points being defined on a circle having a diameter equal to that of the magnet 15, while four inner points being defined on another circle having a diameter equal to that of the inner periphery of the magnet 15, the inner points being rotated through 45° from the outer points. The driving coils are superimposed one on the other concentrically with the driving shaft 13 and are secured to the insulation plate 22 by means of an adhesive.

Each of the coils 26, 27 has driving wire elements extending from the inner periphery to the outer periphery of the coil, or vice versa, which intersect the fluxes of the magnet 15, the portions of intersection constitute driving portions 29, 30 for driving the magnet 15. Thus, the driving portions contain driving wire elements extending toward the outer periphery from the rotary shaft 13. The coils 26, 27 are superimposed one on the other such that their driving portions 29, 30 form therebetween an angle of 22.5°.

A plurality of radially extending generating wire elements 31 are formed on the upper surface of the insulation plate 22 and are connected in series to form a speed detecting coil 50. Thus, as seen from FIG. 3, the speed detecting coil 50 comprises a plurality of radially extending generating wire elements 31, 32, 33, 34, 35 . . . formed on the upper surface of the insulation plate 22. The first wire element 31 is connected to an adjacent second element 32 at its inner end, while the second element 32 in turn is connected at its radially outer end to a third element 33. The third element 33 and a fourth element 34 are connected to each other at their inner ends. The adjacent wire elements are connected in series in the described manner.

The speed detecting coil 50 can advantageously be formed by printing. To this end, a copper foil is secured onto the surface of the insulating plate 22 on which formed are the elements 31, 32, 33 . . . and their connecting portions by means of printing. Then, the foil is subjected to a corrosion process with the printed portion being covered, so that the uncovered portion may be corroded. The number of the wire elements 31, 32, 33 . . . is, for each magnet pole of the magnet 15, $2n + 1$, where $n$ is a positive integer. The embodiment of FIG. 3 has 24 wire elements in total, three elements for each one of the eight magnet poles, i.e. $n$ equals to 1, while in the embodiment of FIG. 2, $n$ equals to 4, since 72 elements are provided, nine for each one of the eight magnetic poles.

The first wire element 31 and the last wire element 35 (the 24th element in FIG. 3) are provided with terminals 36, 37 to which connected are lead wires to form output terminals of the speed detecting coil 50.

The cup-shaped upper cover 3 has an opening 38 at the center of its upper plate 4, in which inserted is the upper end of the rotary shaft 13. The upper cover has a rim 6 which is in contact with and secured to the base plate 2 by screws 39.

The rotary shaft 13 has a pointed upper end adapted to play the role of a central shaft for a turn table carrying a record disk, when the motor is used for driving a disk record player.

In operation, a sine-wave alternating current is supplied to each of the driving coils 26, 27. More strictly, there is a phase differential of 90°, between the current supplied to the coil 26 and the current supplied to the coil 27. Accordingly, magnetic fluxes are produced around the copper wires forming the coils 26, 27, among which the fluxes generated by the driving portions 29, 30 intersect the magnetic fluxes provided by the poles 17, 18, 19 . . . 20 of the magnet 15, so as to impart to the latter a torque effective to rotate the magnet 15 clockwisely.

Supposing here that direct currents are supplied to the coils 26, 27, a negative torque is generated at certain portions of rotation, since the adjacent magnetic poles are reversely magnetized. However, according to the invention, no reversing torque is resulted, since the coils 26, 27 are supplied with respective alternating currents which are effective to change the polarities of the poles which would, for otherwise, produce the negative or reversing torque. Thus, the magnet 15 is allowed to rotate smoothly in one direction.

The torque imparted to the magnet 15 is a function of the angular position of the magnet 15, i.e. sine of the angle of rotation. In the described embodiment, the coils 26, 27 are rotated through 22.5° from each other. As aforementioned, the coil 27 is supplied with an alternating current which has a phase differential of 90° with respect to the alternating current for the coil 26. In other words, while the coil 26 is supplied with a sine-wave alternating current, the coil 27 is supplied with a cosine-wave alternating current. These angular differential and the phase differential in combination provide a constant torque imparted to the magnet 15.

As the magnet 15 rotates, the magnetic fluxes generated by the magnetic poles 17, 18, . . . 20 rotate intersecting the generating wire elements 31, 32, . . . 35 of the speed detecting coil 50, inducing signals of voltage corresponding to the change in flux densities and of frequency corresponding to that of the change. The signal is induced in the wire element passed by the gaps between the magnetic poles 17, 18, . . . 20. Since the wire elements are $2n + 1$ in number for each magnetic pole of the magnet 15, the signal generated in the wire elements are conveniently synchronized and are arithmetically added to form a current flowing in one direction.

FIGS. 4A and 4B show a relationship, in an explosive illustration, between the signal generated in the generating wire elements in the speed detecting coil 50 and the magnetic poles. FIG. 4A shows an arrangement in which $n$ equals to 1, i.e. three wire elements for each magnetic pole, while FIG. 4B shows an arrangement having five wire elements for each magnetic pole, i.e. $n$ being 2.

Referring to FIG. 4A, three wire elements 31, 32, and 33 correspond to the magnetic pole 18, while another three wire elements 34, 41 and 42 correspond to the magnetic pole 19. Supposing that the magnet 15 moves in the right-hand side direction, as shown by an arrow, as viewed on FIG. 4A and FIG. 4B, the wire element 31 disposed confronting the gap between the poles 17, 18 which has intersected the magnetic flux of the magnetic pole 18 comes to intersect the flux provided by the pole 17. This change in the direction of the magnetic flux produces a voltage in the wire element 31. Meanwhile, no voltage is induced in the other wire elements 32, 33, since they are not subjected to the change in the magnetic flux. The polarity of the voltage induced in the wire element 31 is supposed here to provide a current which flows upwardly as designated by an arrow, a downwardly flowing current is induced in the wire element 34 which is disposed confronting the gap between the magnetic poles 18 and 19. For the same reason, at the same time, an upwardly flowing current and a downwardly flowing current are generated in the wire elements 43 and 44, respectively, which elements being disposed between the poles 15, 20 and between the poles 20, 40, respectively. It will be understood that the resulted currents are of the same flowing direction and can be arithmetically added as an output signal. Similarly, in the arrangement of FIG. 4B, voltages of the same polarity are induced in the wire elements 31, 42, 43 and 44, resulting currents of same direction of flow in the speed detecting coil 50. Since the arrangement of FIG. 4B has a larger number of generating wire elements than the arrangement of FIG. 4B, a correspondingly higher frequency of the signal is obtained.

Each generating wire element intersects successive magnetic fluxes, as the magnet 15 rotates, so that the resulting frequency of the output signal is in proportional to the speed of revolution of the magnet 15.

It will be seen that eight magnetic poles simultaneously detects the revolution speed, so that the fluctuation in magnetization of the poles and the minor deviations of the poles are conveniently negated to provide a correct measuring of the revolution speed.

The frequency of the output signal is then compared with a frequency of a reference signal, the resultant difference is utilized in raising or lowering the voltages of the alternating current supplied to the driving coils 26, 27, thereby to maintain the revolution speed constant. Alternatively, the output frequency from the speed detecting coil 50 is transduced to a voltage which is then compared with a reference voltage to provide a control input for regulating the revolution speed of the magnet 15.

It will be clear from the foregoing description that the invention provides an electric motor having a magnet constituting a rotor and being adapted to detect the revolution speed of itself, which renders the speed control accurate, in spite of the small-sized and simplified structure. The motor can be sufficiently flattened by the adoption of a disk-shaped magnet and a thin driving coil. In addition, a remarkably high frequency of output signal is obtained through the adoption of a number of generating wire elements which are conveniently formed by means of printing at a high dimensional accuracy. The motor does not employ a commutator nor a brush which would produce unfavourable noises, since sine-wave alternating current is effectively used for driving the motor.

Although several embodiments have been described with specific terms, it is to be understood that various changes and modifications may be imparted thereto without departing from the scope of the invention which is limited solely by the appended claims.

What is claimed is:

1. An electric motor incorporating a frequency generator comprising a rotary shaft, a disk-shaped multipolar magnet having a plurality of magnetizable sectors, said sectors being magnetized to exhibit poles of different polarities at both thicknesswise ends, adjacent ones of said sectors being poles of reverse polarities, a pair of flat driving coils disposed parallely with and spaced from said magnet and within a field of said magnet, and a flat speed detecting coil disposed parallely on and spaced from said magnet and within a magnetic field of said magnet, said driving coils and said speed detecting coil being arranged to be nonrotatable, each of said driving coils having a plurality of driving portions interlinking with magnetic flux of said magnet, said speed detecting coil having $2n + 1$ radially extending generating wire elements corresponding to each one of said magnetic poles, said wire elements being serially connected, whereby said speed detecting coil acts as a frequency generator producing a signal having a frequency corresponding to a revolution speed of said magnet, when said driving coils are supplied with electrical power.

2. An electric motor as claimed in claim 1, wherein said driving portions of said driving coils consist of a plurality of driving wire elements extending from a center of said driving coils toward their peripheries, said driving portions being adapted to impart a driving torque to said magnet upon receipt of an alternating electric power of a commercially available frequency, said driving coils being rotatably positioned with respect to one another so that their driving portions are not superimposed.

3. An electric motor comprising:
a yoke made of a magnetic material;
a rotary shaft rotatably carried by said yoke;
a disk-shaped multipolar magnet connected to said rotary shaft and sectioned to have a plurality of magnetic poles;
a pair of driving coils mounted on said yoke and having a plurality of driving portions interlinking with magnetic flux of said magnet, one of said pair of driving coils being supplied with a first a.c. driving current and producing at the driving portions thereof a driving magnetic field interlinking with the magnetic flux of said magnet for driving said magnet, the other of said pair of driving coils being supplied with a second a.c. driving current, the phase of which is 90° different from that of the first a.c. driving current, and producing at the driving portions thereof a driving magnetic field interlinking with the magnetic flux of said magnet for driving said magnet;

a speed detecting coil disposed in the magnetic field of said magnet having series-connected generating wire elements, the number of said generating wire elements being $2n + 1$ for each of said magnetic poles, where $n$ is a positive integer, whereby a signal having a frequency corresponding to a revolution speed of said magnet is obtained in said speed detecting coil; and a frequency generator constituted by said speed detecting coil and said magnetic poles and producing a signal having a frequency corresponding to a rotational speed of said motor.

4. An electric motor having a frequency generator capable of producing a signal having a frequency corresponding to the revolution speed of said motor comprising:

a yoke made of a magnetic material;
a rotary shaft rotatably carried by said yoke;
a disk-shaped multipolar magnet connected to said rotary shaft, said magnet being sectioned to have a plurality of magnetic poles;
first and second star-shaped driving coils angularly displaced with respect to one another on said yoke and each having a plurality of driving portions interlinking with the magnetic flux of said magnet, said first driving coil being supplied with a driving a.c. current of sine wave and producing at the driving portions thereof a driving magnetic field interlinking with the magnetic flux of said magnet for driving said magnet,
said second driving coil being supplied with a driving a.c. current of cosine wave and producing at the driving portions thereof a driving magnetic field interlinking with the magnetic flux of said magnet for driving said magnet;
a speed detecting coil non-rotatably disposed within the magnetic field of said magnet and having series-connected generating wire elements, the number of said generating wire elements being $2n + 1$ for each of said magnetic poles, where $n$ is a positive integer, whereby a signal having a frequency corresponding to the rotational speed of said magnet is obtained in said speed detecting coil; and
means for controlling said driving currents in accordance with the signal having a frequency corresponding to the rotational speed of said magnet and obtained from said speed detecting coil.

5. An electric motor having a frequency generator as claimed in claim 4, wherein said magnet comprises a disk-shaped ferrite core having a plurality of radially divided sections, each being magnetized in a thickness direction thereof.

6. An electric motor having a frequency generator as claimed in claim 4, wherein the magnetic pole of sections of said magnet exhibits different polarities, adjacent ones of said sections being of reverse polarities.

7. An electric motor having a frequency generator as claimed in claim 5, wherein the magnetic pole of sections of said magnet exhibits different polarities, adjacent ones of said sections being of reverse polarities.

8. An electric motor having a frequency generator as claimed in claim 4, wherein said speed detecting coil comprises a printed wiring coil in which said generating wire elements extend in a radial direction thereof and are connected in series with each other.

9. An electric motor having a frequency generator as claimed in claim 4, wherein the speed detecting signal of said speed detecting coil is used for controlling of the rotational speed of said magnet.

10. An electric motor having a frequency generator comprising:

a yoke made of a magnetic material;
a rotary shaft rotatably carried by said yoke;
a disk-shaped multipolar magnet connected to said rotary shaft, said magnet being sectioned to have a plurality of magnetic poles, said magnetic poles being magnetized so that adjacent ones of said poles have different polarities;
a first driving coil mounted on said yoke and supplied with a driving a.c. current of sine wave to produce a driving magnetic field interlinking with the magnetic flux of said magnet for driving said magnet;
a second driving coil displaced at an angle of 22.5° and arranged concentrically with respect to said first driving coil, said second driving coil being supplied with a driving a.c. current of cosine wave to produce a driving magnetic field interlinking with the magnetic flux of said magnet for driving said magnet; and
a speed detecting coil disposed within the magnetic field of said magnet, said speed detecting coil having series-connected generating wire elements, the number of said generating wire elements being $2n + 1$ for each of said magnetic poles, where $n$ is a positive integer, whereby a speed detecting signal having a frequency corresponding to the rotational speed of said magnet is obtained in said speed detecting coil.

11. An electric motor having a frequency generator as claimed in claim 10, wherein said magnet is provided with eight magnetic poles, each of which is magnetized in its thicknesswise direction.

12. An electric motor having a frequency generator as claimed in claim 10, wherein said first and second driving coils are respectively star-shaped, each of which is provided with eight driving portions.

13. An electric motor having a frequency generator comprising:

a first yoke made of a magnetic material;
a bearing secured to said first yoke;
a rotary shaft rotatably supported by said bearing;
a second yoke secured to said rotary shaft and spaced from and oppositely to said first yoke;
a disk-shaped multipolar magnet secured to said second yoke and spaced from said first yoke, said magnet being adapted to rotate with the rotation of said rotary shaft and said second yoke;
eight magnetic poles formed by radially dividing said magnet into eight sections, adjacent ones of the sections being magnetized to have different polarities;
an insulating plate disposed between said first yoke and said magnet and secured to said first yoke;
first and second driving coils each provided with a plurality of driving portions and superimposed on said insulating plate so that the driving portions thereof form an angle of 22.5° therebetween, said first driving coil being supplied with an a.c. driving current of sine wave and producing at the driving portions thereof a first driving magnetic field interlinking with the magnetic flux of said magnet for driving said magnet, and said second driving coil being supplied with an a.c. driving current of cosine wave and producing at the driving portions thereof a second driving magnetic field interlinking with the magnetic flux of said magnet for driving said magnet in the same direction as that driven by said first driving magnetic field; and a speed detecting coil opposite to said magnet and mounted on said insulating plate, said speed detecting coil having $2n + 1$ series-connected generating wire elements for each of said magnetic poles and which radially extend from the center of said rotary shaft, where $n$ is a positive integer, whereby a signal having a frequency corresponding to the rotational speed of said magnet is obtained in said speed detecting coil.

* * * * *